United States Patent [19]
Roth

[11] 3,899,468
[45] Aug. 12, 1975

[54] NOVEL INTERPOLYMER OF AMINE, ALDEHYDE AND SULFANILAMIDE

[75] Inventor: Shirley H. Roth, Highland Park, N.J.

[73] Assignee: Cities Service Company, Tulsa, Okla.

[22] Filed: June 27, 1974

[21] Appl. No.: 483,859

Related U.S. Application Data

[63] Continuation-in-part of Ser. No. 291,847, Sept. 25, 1972, abandoned.

[52] U.S. Cl. .................. 260/67.6 R; 260/30.4 N; 260/30.8 DS; 260/32.8 N; 260/69 F; 260/69 N; 260/70 R; 260/72.5

[51] Int. Cl.² ............ C08G 12/08; C08G 12/30; C08G 12/32; C08G 12/36

[58] Field of Search ......... 260/72.5, 67.6 R, 67.6 C, 260/70 R, 69 F, 69 N

[56] References Cited
OTHER PUBLICATIONS

Chem. Abstracts, Vol. 42, 1948, 6577c, Kuwata et al.
Chem. Abstracts, Vol. 45, 1951, 3510h–i, Fujiwara.
Chem. Abstracts, Vol. 48, 1954, 10368a–c, Bapische Aniline

*Primary Examiner*—Howard E. Schain
*Attorney, Agent, or Firm*—Patrica J. Hogan

[57] ABSTRACT

The novel interpolymers of the invention are water-insoluble amine-sulfonamide-aldehyde interpolymers in which the sulfonamidealdehyde units correspond to the formula:

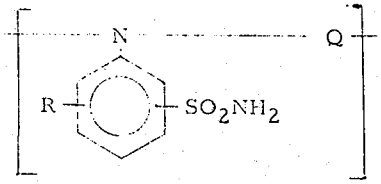

wherein Q is the aldehyde residue and R is hydrogen, alkyl, haloalkyl, alkoxy, haloalkoxy, halo, nitro, acetamido, or sulfonamido. According to a preferred embodiment of the invention, the interpolymers are sulfanilamide-urea-formaldehyde interpolymers.

10 Claims, No Drawings

NOVEL INTERPOLYMER OF AMINE, AIDEHYDE AND SULFANILAMIDE

CROSS-REFERENCE TO RELATED APPLICATION

This application is a continuation-in-part of copending application Ser. No. 291,847, filed Sept. 25, 1972, now abandoned.

BACKGROUND OF THE INVENTION

1. Field of the Invention

This invention relates to amine-aldehyde interpolymers and more particularly relates to such interpolymers having a sulfanilamide-type component.

2. Description of the Prior Art

It is known that amines may be condensed with aldehydes to form interpolymers, the most common of which are urea-formaldehyde and melamine-formaldehyde. It is also known that sulfanilamide-type compounds may be co-condensed with an amine and an aldehyde and that the aldehyde interpolymers prepared therefrom are characterized by containing units wherein the aldehyde residues are bonded to the sulfanilamide-type residues by the abstraction from the sulfanilamide-type compound of hydrogens other than or in addition to the hydrogens of the amino group. This is the type of sulfanilamide-urea-formaldehyde interpolymer prepared by Tsutomo Kuwata and Taiseki Kuriki, J. SOC. CHEM. IND. JAPAN, Vol. 47, pp. 841–843 (1944), for example.

SUMMARY OF THE INVENTION

An object of this invention is to provide novel interpolymers of a sulfanilamide-type sulfonamide, an amine, and an aldehyde.

Another object is to provide such interpolymers wherein the sulfanilamide-type residues are bonded to aldehyde residues through the nitrogen of the amino group.

These and other objects are attained by reacting with an amine and an aldehyde in a liquid medium at an apparent pH of about 3–9 and a temperature of about 0°–50°C. a sulfonamide corresponding to the formula:

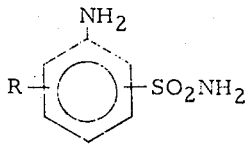

wherein R is hydrogen, alkyl, haloalkyl, alkoxy, haloalkoxy, halo, nitro, acetamido, or sulfonamido. The product of the reaction is an amine-sulfonamide-aldehyde interpolymer consisting essentially of about 50–1 mol percent of amine-aldehyde units and about 50–99 mol percent of sulfonamide-aldehyde units corresponding to the formula:

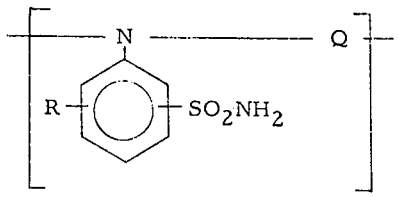

wherein Q is the aldehyde residue.

DESCRIPTION OF THE PREFERRED EMBODIMENTS

As indicated by the above formulas, the sulfonamide of the invention is a sulfanilamide-type compound, i.e., a substituted or unsubstituted o-, m-, or p-aminobenzenesulfonamide. When the sulfanilamide-type compound bears an organic substituent, it is preferred that the substituent contain 1–5 carbon atoms. When halo substituents are present, it is preferred that they be chloro or bromo. Exemplary of these sulfonamides are sulfanilamide, o-aminobenzenesulfonamide, m-aminobenzenesulfonamide, 4-amino-2-ethylbenzenesulfonamide, 2-amino-3-chloromethylbenzenesulfonamide, 3-amino-2-butoxybenzenesulfonamide, 4-amino-3-bromomethoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1,3-disulfonamidobenzene, etc., and mixtures thereof. The preferred sulfonamide is sulfanilamide.

The amine which is co-condensed with the sulfonamide and aldehyde in the practice of the invention may be any of the amines which are known to condense with aldehydes. However, it is usually urea, thiourea, ethyleneurea, melamine, guanidine, aminoguanidine, cyanamide, and/or dicyandiamide, preferably urea. The amount of amine employed is such as to provide a sulfonamide/amine mol ratio of about 1–99/1 in the reaction mixture and in the product.

The aldehyde which is condensed with the sulfonamide and the amine may be saturated or unsaturated and may be aliphatic, alicyclic, or aromatic. Exemplary of these aldehydes are formaldehyde, acetaldehyde, propionaldehyde, butyraldehyde, pentaldehyde, hexaldehyde, octaldehyde, benzaldehyde, furfural, acrolein, methacrolein, crotonaldehyde, cinnamaldehyde, etc., and mixtures thereof. The mol ratio of aldehyde to amino components (i.e., sulfonamide and amine) in the reaction mixture may vary from about 0.5–5/1, preferably about 0.9–5/1. Only about 0.5–1 (usually about 1) molar proportion of the aldehyde actually reacts with the amino components, but an excess of aldehyde is sometimes desirable to force the reaction to completion.

The reaction is conducted with agitation in a liquid medium at an apparent pH of about 3–9, preferably about 3–7, most preferably about 3.5–6. When the liquid medium is water, the reaction is conducted in dispersion, e.g., in an aqueous slurry, emulsion, or suspension. When the liquid medium is an organic solvent, the reaction may be conducted in solution. Ordinarily, the amount of liquid medium employed is such as to provide at least about 1 cc. of medium per gram of amino components.

The reaction is conducted at a temperature in the range of about 0°–50°C., preferably about room temperature, and may be completed in a matter of seconds. Ordinarily, however, the reaction conditions are maintained for about 1–60 minutes and may be maintained for even longer periods, e.g., up to 3 hours, without ill effect.

Since the reaction is so rapid, a catalyst is normally unnecessary. However, if desired, a catalyst may be used. Suitable catalysts include salts of metals that form complexes with amines, e.g., zinc, lead, cadmium, etc., especially zinc chloride.

When a non-aqueous liquid medium is employed, it may be any suitable solvent, such as acetone, dimethylformamide, dimethylsulfoxide, 2-methoxyethanol, dioxane, tetrahydrofuran, etc. When the reaction is conducted in aqueous suspension, the reaction mixture contains a suspending agent, preferably a non-ionic suspending agent, such as polyvinyl alcohol. During or after the reaction, the product may be modified by the incorporation of additives, such as pigments, dyes, fillers, plasticizers, stabilizers, etc.

The products of the invention are novel amine-sulfonamidealdehyde interpolymers which consist essentially of about 50-1, preferably about 50-10, mol percent of amine-aldehyde units and about 50-99, preferably about 50-90, mol percent of sulfonamidealdehyde units corresponding to the formula:

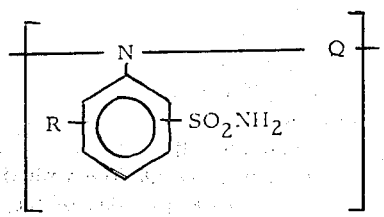

In these interpolymers, as already mentioned, Q is the aldehyde residue, e.g.,

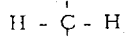

in the case of a formaldehyde residue,

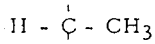

in the case of an acetaldehyde residue,

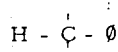

in the case of a benzaldehyde residue,

in the case of an acrolein residue, etc. The configurations of the amine residues are also conventional, the preferred configurations being those of the linear polymer type, e.g., - NHCONH - in the case of urea, etc.

The preferred interpolymers of the invention contain a total of about 2–10 sulfanilamide-aldehyde and amine-aldehyde units. The amino components/aldehyde mol ratio in the interpolymers is about 1:1 but may vary from this exact figure, and the nature of the terminal groups naturally varies with the particular mol ratio. Thus, the interpolymers may be amine-terminated, as in the case of:

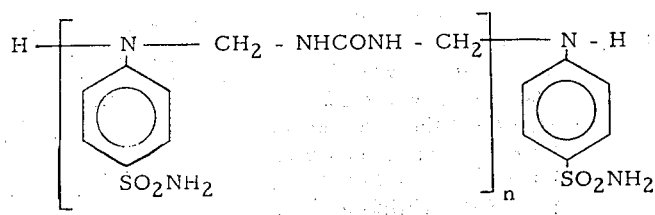

hydroxy-terminated, as in the case of:

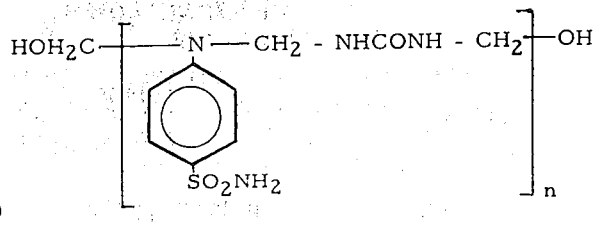

or amine-hydroxyl-terminated, as in the case of:

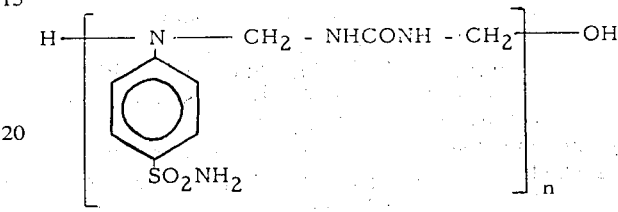

The interpolymers are water-insoluble and more soluble in common organic solvents, such as acetone, dimethylformamide, dimethylsulfoxide, 2-methoxyethanol, dioxane, tetrahydrofuran, etc., than comparable interpolymers of the prior art. They are useful as dye intermediates, are also useful for the same applications as comparable sulfonamide-amine-aldehyde interpolymers of the prior art, and are particularly useful in intumescent coating compositions.

The following examples are given to illustrate the invention and are not intended as a limitation thereof.

EXAMPLE I

To an agitated slurry of 68.9 g. of sulfanilamide in 400 cc. of water, simultaneously add increments of (1) 38.6 cc. of 37 percent formaldehyde solution and (2) a solution of 17.2 g. of urea in 100 cc. of water over a period of 50 minutes. Continue agitating the reaction mixture for an additional hour. Filter, wash, and dry the product. Analysis shows the product to be a sulfanilamide-urea-formaldehyde terpolymer which contains a total of about 2–10 sulfanilamide-formaldehyde and urea-formaldehyde units and in which the sulfanilamide-formaldehyde units correspond to the formula:

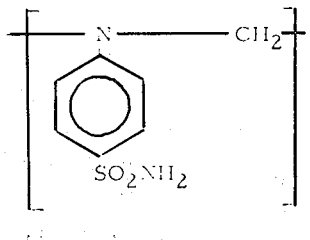

EXAMPLE II

Dissolve 12 g. of urea in 150 cc. of water. Add 34.4 g. of sulfanilamide. Stir the reaction mixture and, while stirring, add 73 cc. of 37 percent formaldehyde solution over a period of 15 minutes - the first 15 cc. being added over the first 7 minutes, the next 38 cc. over the next 3 minutes, and the remainder at 15 minutes. Continue stirring for another 2 hours. Then vacuum filter, wash, and air dry the product. Analysis shows the product to be similar to that of Example I.

EXAMPLE III

Stir 0.26 g. of polyvinyl alcohol in 500 ml. of water. Add 34.4 g. of melamine and 51.7 g. of sulfanilamide. After stirring for 10 minutes, add 42.4 ml. of 37.3 percent formaldehyde solution over a period of 50 minutes. Continue stirring for an additional hour. Then vacuum filter, wash, and air dry the product. Analysis shows the product to be a sulfanilamide-melamine-formaldehyde terpolymer which contains a total of about 2–10 sulfanilamide-formaldehyde and melamine-formaldehyde units and in which the sulfanilamide-formaldehyde units correspond to the formula:

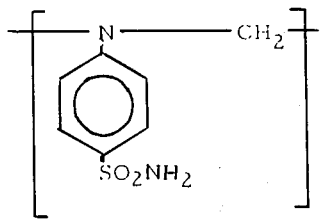

Similar results are observed when the examples are repeated except that the sulfanilamide, urea, melamine, and formaldehyde are replaced by the materials taught to be their equivalents in the specification.

It is obvious that many variations may be made in the products and processes set forth above without departing from the spirit and scope of this invention.

What is claimed is:

1. A water-insoluble amine-sulfonamide-aldehyde interpolymer consisting essentially of (A) about 50–99 mol percent of sulfonamide-aldehyde units corresponding to the formula:

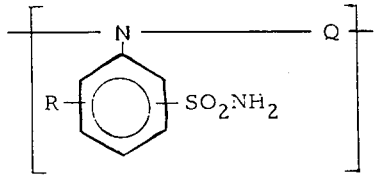

wherein Q is the aldehyde residue and R is hydrogen, alkyl, haloalkyl, alkoxy, haloalkoxy, halo, nitro, acetamido, or sulfonamido and (B) about 50-1 mol percent of amine-aldehyde units wherein the amine is selected from the group consisting of urea, thiourea, ethyleneurea, melamine, guanidine, aminoguanidine, cyanamide, and/or dicyandiamide.

2. The interpolymer of claim 1 which contains a total of about 2–10 sulfonamide-aldehyde and amine-aldehyde units.

3. The interpolymer of claim 1 which contains about 50–90 mol percent of sulfonamide-aldehyde units.

4. The interpolymer of claim 1 wherein R is hydrogen.

5. The interpolymer of claim 1 wherein the sulfonamide portion of the sulfonamide-aldehyde units corresponds to the formula:

6. The interpolymer of claim 1 wherein the aldehyde is an alkanal containing 1–5 carbon atoms.

7. The interpolymer of claim 6 wherein the alkanal is formaldehyde.

8. The interpolymer of claim 1 wherein the sulfonamide-aldehyde units correspond to the formula:

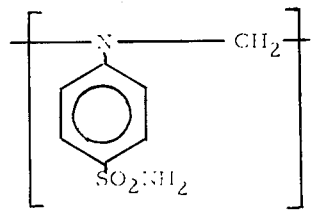

9. The interpolymer of claim 1 wherein the amine-aldehyde units are urea-formaldehyde units.

10. The interpolymer of claim 1 wherein the amine-aldehyde units are melamine-formaldehyde units.

* * * * *